United States Patent
Shimizu

(10) Patent No.: US 10,421,491 B2
(45) Date of Patent: Sep. 24, 2019

(54) VEHICULAR STEERING ASSISTANCE CONTROL DEVICE

(71) Applicant: Hitachi Automotive Systems, Ltd., Hitachinaka-shi, Ibaraki (JP)

(72) Inventor: Ryosuke Shimizu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/579,446

(22) PCT Filed: Jul. 20, 2016

(86) PCT No.: PCT/JP2016/071197
§ 371 (c)(1),
(2) Date: Dec. 4, 2017

(87) PCT Pub. No.: WO2017/022474
PCT Pub. Date: Feb. 9, 2017

(65) Prior Publication Data
US 2018/0141588 A1 May 24, 2018

(30) Foreign Application Priority Data
Jul. 31, 2015 (JP) .................................. 2015-151448

(51) Int. Cl.
*B62D 15/02* (2006.01)
*B62D 6/00* (2006.01)
(Continued)

(52) U.S. Cl.
CPC .............. *B62D 15/025* (2013.01); *B62D 6/00* (2013.01); *B62D 6/02* (2013.01); *B62D 6/08* (2013.01);
(Continued)

(58) Field of Classification Search
CPC .................................................. B62D 15/025
See application file for complete search history.

(56) References Cited

U.S. PATENT DOCUMENTS

2007/0233386 A1* 10/2007 Saito .................... B62D 15/025
701/300
2009/0171533 A1 7/2009 Kataoka
(Continued)

FOREIGN PATENT DOCUMENTS

DE 10 2006 027 325 A1 12/2007
DE 10 2007 027 495 A1 12/2008
(Continued)

OTHER PUBLICATIONS

International Search Report (PCT/ISA/210) issued in PCT Application No. PCT/JP2016/071197 dated Sep. 13, 2016 with English translation (three pages).
(Continued)

*Primary Examiner* — Alex C Dunn
(74) *Attorney, Agent, or Firm* — Crowell & Moring LLP

(57) ABSTRACT

The purpose of the present invention is to obtain assistance for traveling in an appropriate position, through steering assistance control, when a driver intends to travel in a position offset either to the left or to the right from the center of a traffic lane. Provided is a vehicular steering assistance control device for controlling a host vehicle so that the vehicle travels in a predetermined position of a traffic lane, wherein the amount of steering control is adjusted according to the driver's intentions.

16 Claims, 13 Drawing Sheets

(51) Int. Cl.
  *B62D 6/02*   (2006.01)
  *B62D 6/08*   (2006.01)
  *G08G 1/16*   (2006.01)

(52) U.S. Cl.
  CPC ..... *B62D 15/0255* (2013.01); *B62D 15/0265* (2013.01); *G08G 1/166* (2013.01); *G08G 1/167* (2013.01)

(56) References Cited

U.S. PATENT DOCUMENTS

| | | | |
|---|---|---|---|
| 2013/0226406 A1 | 8/2013 | Ueda et al. | |
| 2014/0136015 A1 | 5/2014 | Hayakawa et al. | |
| 2015/0120142 A1* | 4/2015 | Park | B62D 6/10 701/41 |
| 2015/0266504 A1* | 9/2015 | Kunihiro | B62D 5/0463 701/41 |

FOREIGN PATENT DOCUMENTS

| | | |
|---|---|---|
| JP | 9-309453 A | 12/1997 |
| JP | 10-203394 A | 8/1998 |
| JP | 11-286280 A | 10/1999 |
| JP | 2000-198458 A | 7/2000 |
| JP | 2003-44137 A | 2/2003 |
| JP | 2004-231096 A | 8/2004 |
| JP | 2012-232639 A | 11/2012 |
| JP | 2013-177055 A | 9/2013 |

OTHER PUBLICATIONS

Japanese-language Written Opinion (PCT/ISA/237) issued in PCT Application No. PCT/JP2016/071197 dated Sep. 13, 2016 (four pages).
Extended European Search Report issued in counterpart European Application No. 16832753.4 dated Feb. 20, 2019 (eight (8) pages).
Japanese-language Office Action issued in counterpart Japanese Application No. 2017-532475 dated Mar. 19, 2019 (four (4) pages).

* cited by examiner

VEHICULAR STEERING ASSISTANCE CONTROL DEVICE

TECHNICAL FIELD

The present invention relates to a vehicular steering assistance control device.

BACKGROUND ART

In order to reduce the burden of a driver in driving a vehicle, there is a steering assistance control device including, as an additional function, the automatic steering operation of detecting the position and shape of a white line with devices, such as radar, a camera, a navigator, and an in-vehicle communication device, and applying steering torque to electric power steering to keep in a traffic lane.

For the calculation of the steering torque in the steering assistance control device, a calculation is typically made with, for example, PID control on the basis of the middle position in a traffic lane and the position and orientation of a host vehicle.

The following technique in the steering assistance control device has been known. In accordance with a previously detectable road environment, such as the shape of a road or construction, with in-vehicle devices, such as GPS and a camera, the middle position in the traffic lane being a goal is offset to perform control (e.g., refer to PTL 1).

In order to prioritize steering of the driver in the steering assistance control device, there is a technique of releasing steering assistance control in a case where intervention of the steering of the driver has been detected. The intervention of the steering of the driver may be determined in a case where a steering angle, a steering angle velocity, and the value of a steering torque sensor each have exceeded a driver steering intervention threshold value (e.g., refer to PTL 2 and PTL 3 below).

CITATION LIST

Patent Literature

PTL 1: Japanese Patent Laid-Open No. 2003-44137
PTL 2: Japanese Patent Laid-Open No. H10-203394
PTL 3: Japanese Patent Laid-Open No. H11-286280

SUMMARY OF INVENTION

Technical Problem

However, according to the conventional technique, in a case where the driver intentionally travels in a position offset from the middle of the traffic lane to either the left or the right with the in-vehicle devices having difficulty in detecting the position, for example, in attempting to approach the opposite side to a side strip in the traffic lane to travel in order to avoid a splash of water occurring in a case where traveling on a puddle on the periphery of the side strip, the driver performs a steering operation toward the opposite side to the side strip. At this time, the steering assistance control device generates the steering torque in the opposite direction to the intention of the driver, the steering torque returning to the middle of the traffic lane. Thus, there is a problem that the burden of the driver rather increases.

Alternatively, the control of the steering assistance control device may be released in order to prevent the burden of the driver in the steering from increasing. However, the assistance with the control cannot be received, and thus there is a problem that convenience degrades.

An object of the present invention is to provide a vehicular steering assistance control device capable of assisting in traveling in an appropriate position with steering assistance control in a case where a driver desirably and intentionally travels in a position offset from the middle of a traffic lane to either the left or the right.

Solution to Problem

In order to solve the above problems, the vehicular steering assistance control device according to the present invention, offsets the middle position of the traffic lane being a goal of the steering assistance control, to either the left or the right intended by the driver when the driver intentionally attempts to travel in the position offset from the middle of the traffic lane to either the left or the right in a case where the traveling is being performed with the steering assistance control performed.

The vehicular steering assistance control device requires an algorithm for detecting that the driver intentionally attempts to travel in the position offset from the middle of the traffic lane to either the left or the right.

Advantageous Effects of Invention

The vehicular steering assistance control device according to the present invention, can assist in traveling in the appropriate position with the steering assistance control in a case where the driver desirably and intentionally travels in the position offset from the middle of the traffic lane to either the left or the right.

DESCRIPTION OF EMBODIMENTS

A vehicular steering assistance control device being one embodiment of the present invention, will be described below with reference to the drawings.

Figure 1:
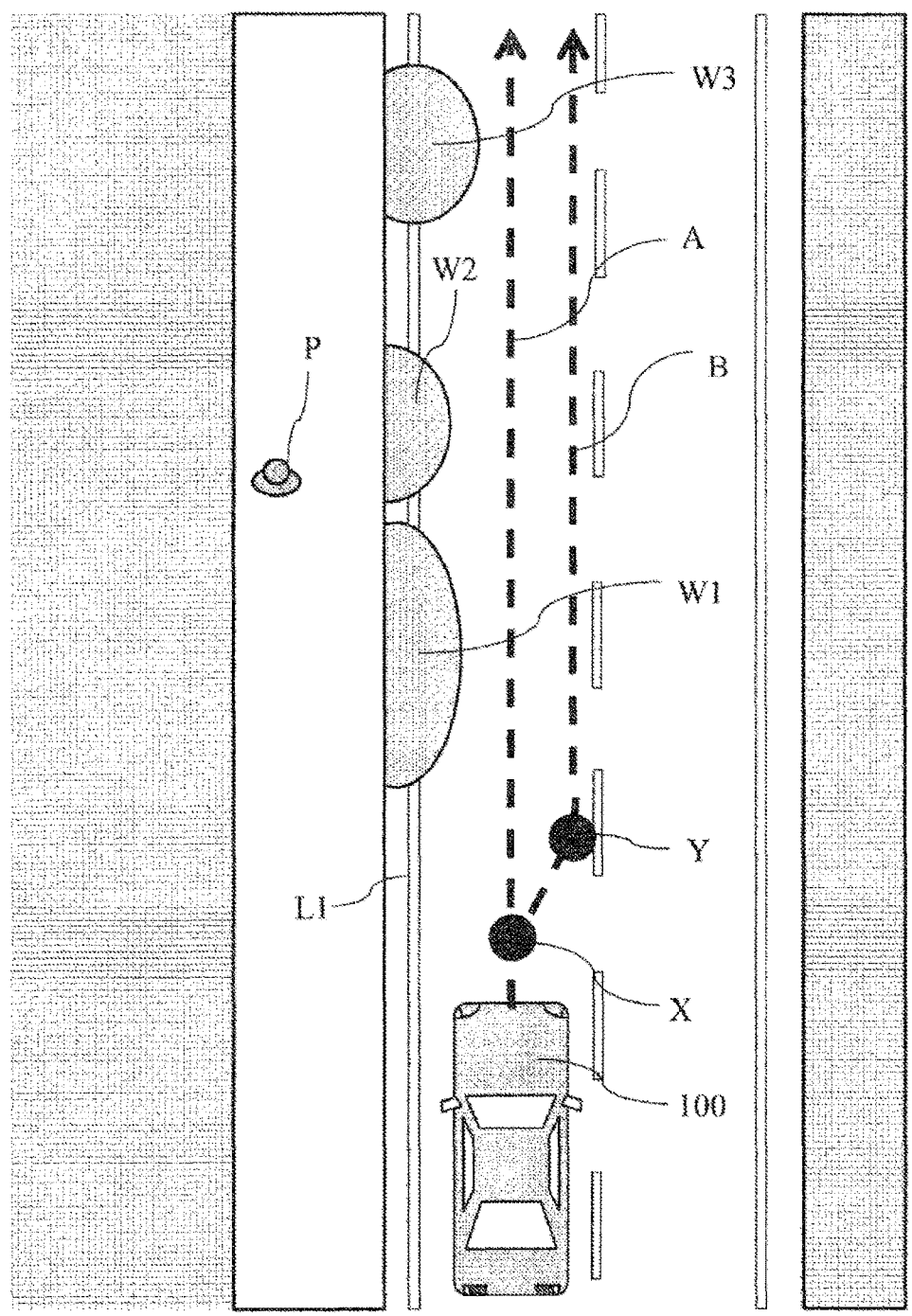
FIG. 1 illustrates a state where a puddle has occurred on the side of a side strip on a travel route of a host vehicle.

As illustrated in FIG. 1, in order to prevent a pedestrian P from being splashed with water by swirling the water when traveling on puddles, the driver of a host vehicle 100 performs a steering operation to travel away from a side strip at a point X at which the driver has recognized occurrence of the puddle W1, and performs a steering operation to correct the travel route from a travel route A of the host vehicle in a case where traveling not away from the puddles W1, W2, and W3 to a travel route B of the host vehicle 100 in a case where traveling away from the puddles W1, W2, and W3. At this time, right steering at the point X and left steering at a point Y are performed to make an attempt to travel on a route in a position away from the side strip L1.

Figure 2:
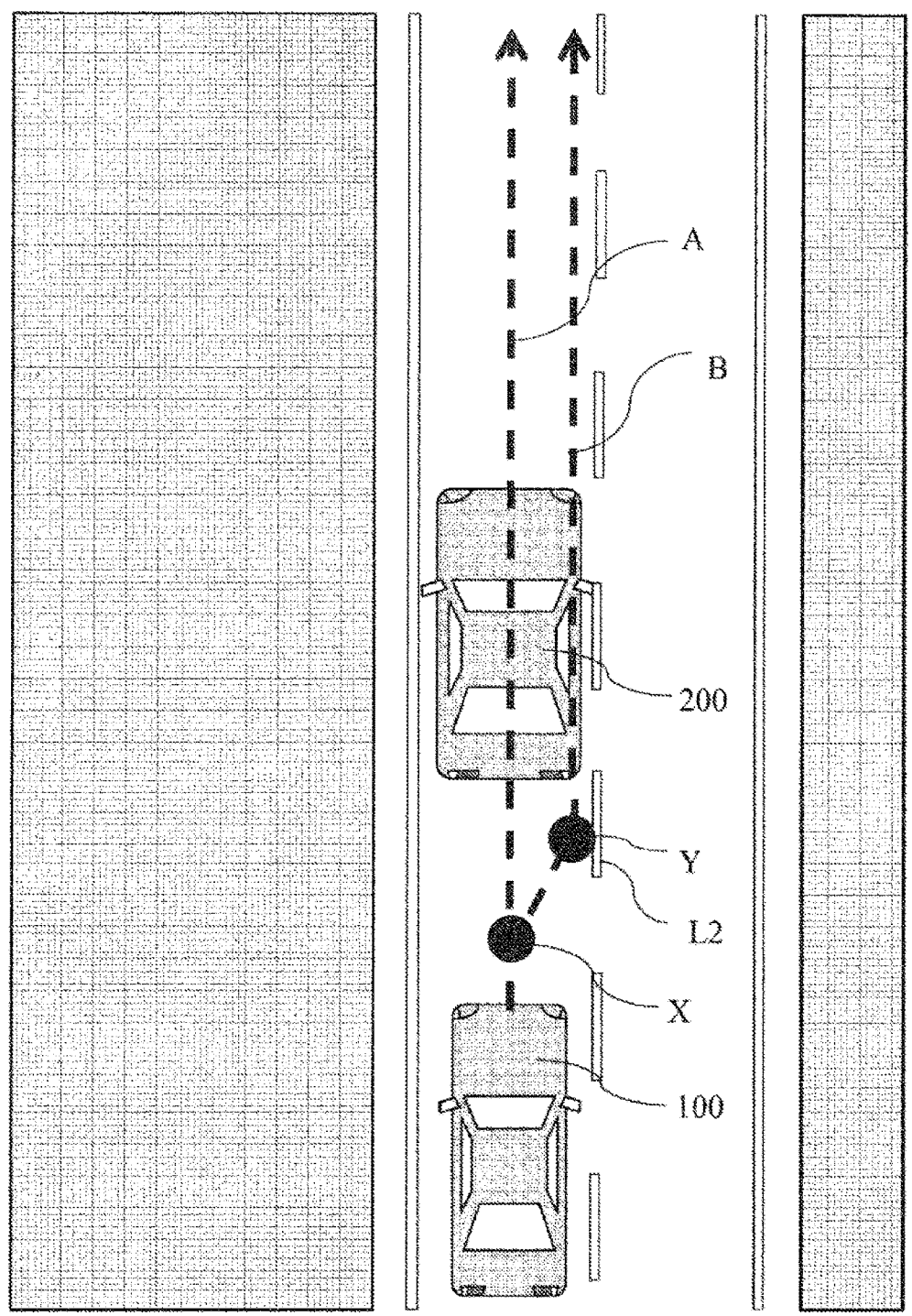
FIG. 2 illustrates a state where a large vehicle is traveling ahead of the host vehicle.

FIG. 2 illustrates a state where a large vehicle is traveling ahead of the host vehicle. In a case where the vehicle 200 traveling ahead of the host vehicle 100 is traveling at a low speed, the driver monitors whether no oncoming vehicle or no obstruction is present in the oncoming lane, and may overtake at the right timing. At this time, in case where the visibility of the driver has been blocked by the vehicle 200 traveling ahead, the traveling may be performed intentionally close to a center line L2 in order to ease the monitoring. In this case, at the timing at which the driver decides to overtake, the travel route is corrected from a travel route A of the host vehicle to a travel route B close to the center line L2. Thus, right steering at a point X and left steering at a point Y are performed to make an attempt to travel in a position close to the center line L2. Note that, a driver continues to travel in the travel route A without, overtaking, and travels right behind the vehicle 200 to reduce air resistance. Thus, the driver may select a method of improving fuel consumption. In addition, a driver may not overtake due to an awareness that the driver is weak at driving, so as to continue to travel in the travel route A.

Figure 3:
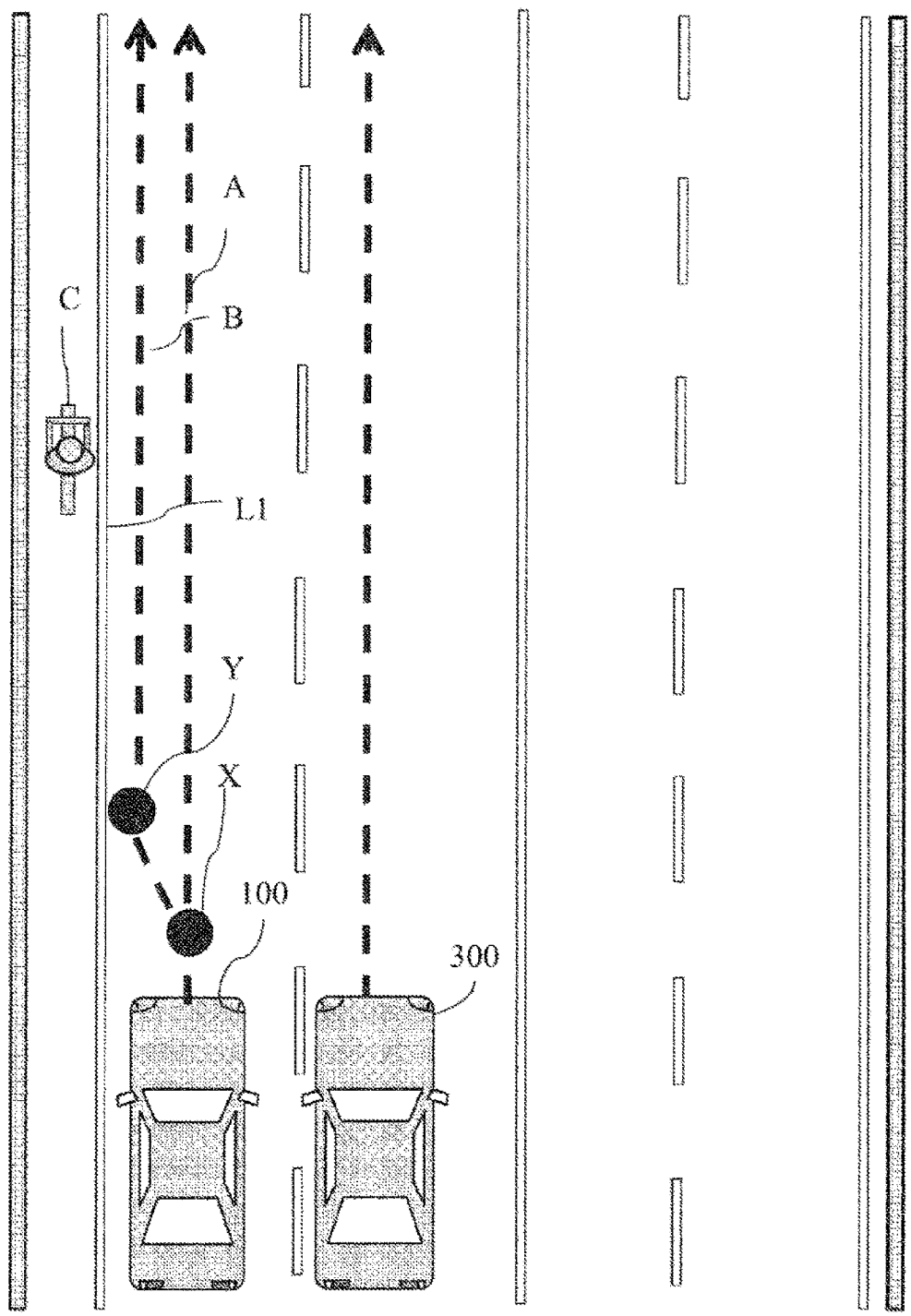
FIG. 3 illustrates a state where a vehicle is traveling, pulling alongside the host vehicle.

FIG. 3 illustrates a state where a vehicle is traveling, pulling alongside the host vehicle. The driver may desirably travel in a position close to the opposite direction to the vehicle 300 in a case where the vehicle 300 pulling alongside the host vehicle 100 is present. In that case, positioning is performed, at a point X at which the pulling alongside has been recognized, in the opposite direction to the vehicle pulling alongside, and thus left steering at the point X and right steering at a point Y are performed in order to correct the travel route from a travel route A of the host vehicle to a travel route B. Note that, depending on peripheral environments, in a case where a bicycle C is traveling on the side of a side strip L1 or in a case where it can be determined that the pulling alongside of the vehicle 300 is in a temporary state in order to avoid an obstruction, the traveling may continue in the travel route A without the route correction to the travel route B.

As described above, an appropriate travel pattern may vary due to a state where the detection is difficult to perform even with a sensor, such as a camera or radar, or the determination of the driver. Examples of the case where the appropriate travel pattern varies, include the following states in addition to the above.

A case where the host vehicle travels on the left in the traffic lane in order to inhibit, for example, a motorcycle approaching from the backward of the host vehicle, from overtaking on the left.

A case where the host vehicle travels on the right in the traffic lane in order to cause, for example, a motorcycle approaching from the backward of the hose vehicle to easily overtake.

A case where the host vehicle travels in a position close to the center line in traveling through a blind intersection.

A case where the host vehicle desirably travels taking a position opposite to an oncoming vehicle since the oncoming vehicle has the headlights on high beam.

A case where the host vehicle desirably travels close to the opposite side to a congested route, being careful of rushing-out in traveling next to the congested route.

A case where the host vehicle desirably keeps a distance from the oncoming lane side when traveling through a location at which a strong crosswind blows, such as on a bridge.

Figure 4:
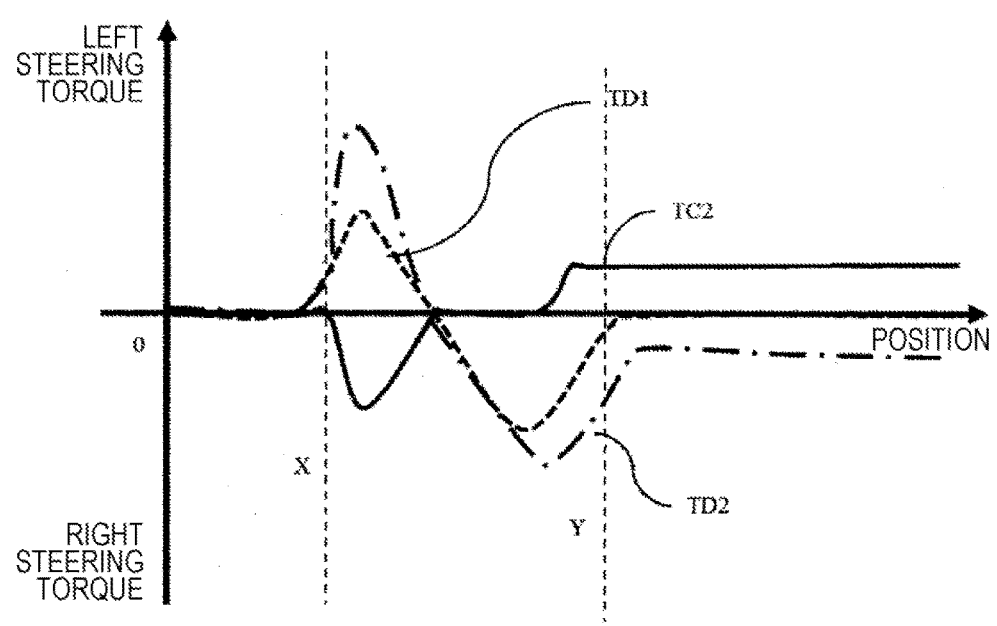
FIG. 4 illustrates a waveform in steering torque performed by a driver and a waveform in steering torque performed by control before the present invention is applied.

FIG. 4 illustrates a waveform in steering torque performed by the driver and a waveform in steering torque performed by control before the present invention is applied, in a case where the appropriate travel pattern varies, as described above. The waveforms illustrated in FIG. 4 will be described with FIG. 1, exemplarily. In the graph illustrated in FIG. 4, the vertical axis represents the value of steering torque. Left steering torque occurs when the value increases in the upper direction, and right steering torque occurs when the value increases in the lower direction. When the value of the origin is taken, it is indicated that no steering torque has occurred. The horizontal axis represents the position of the host vehicle 100 in the front and back direction. The point X and the point Y illustrated in FIG. 1 agree with X on the horizontal axis of the graph and Y on the horizontal axis of the graph, respectively. In FIG. 4, a waveform TD1 represents driver steering torque in steering assistance non-control, a waveform TD2 represents the driver steering torque in steering assistance control, and a waveform TC2 represents control steering torque in the steering assistance control.

The driver steering torque TD1 in the steering assistance non-control, generates only the right steering torque at the point X and the left steering torque at the point Y illustrated in FIG. 1, so as to set the yaw angle of the host vehicle to the traffic lane, to an angle of zero. In comparison to the driver steering torque TD1 in the steering assistance non-control, the driver steering torque TD2 in the steering assistance control, performs right steering at the point X due to the driver, similarly to the driver steering torque TD1. Note that, since the host vehicle separates from the travel route A in which traveling is performed in the middle of the traffic lane, the control attempts to return to the travel route A so that the steering assistance torque TC2 with the control is generated in the left direction. In contrast, the driver increases the driver steering torque in the right direction to balance with the control steering torque, in order to travel in the travel route B. Since the control steering torque increases in the left direction in accordance with the increase above, the driver steering torque TD2 and the control steering torque TC2 continue to increase until the driver performs an operation of returning the steering back. After the operation of returning the steering back due to the driver, the driver performs left steering toward the point Y so that the yaw angle of the host vehicle to the traffic lane is set to an angle of zero. In this case, as the yaw angle of the orientation of the host vehicle to the traffic lane approaches the angle of zero, the driver steering torque TD2 attempts to vary to zero. However, it is determined that the travel route of the host vehicle does not lead to the middle of the traffic lane, and thus the control steering torque TC2 makes an increase in the steering torque in the left direction. Note that, since attempting to retain the yaw angle to the traffic lane at the angle of zero, the driver makes an increase in the steering torque in the right direction. Then, while traveling in the position, from the point Y, in which the traveling is performed with the yaw angle of the orientation of the host vehicle to the traffic lane, retained at the angle of zero, the driver must retain the steering torque constantly increasing in the right direction, resulting in fatigue due to the steering of the driver.

Figure 5:
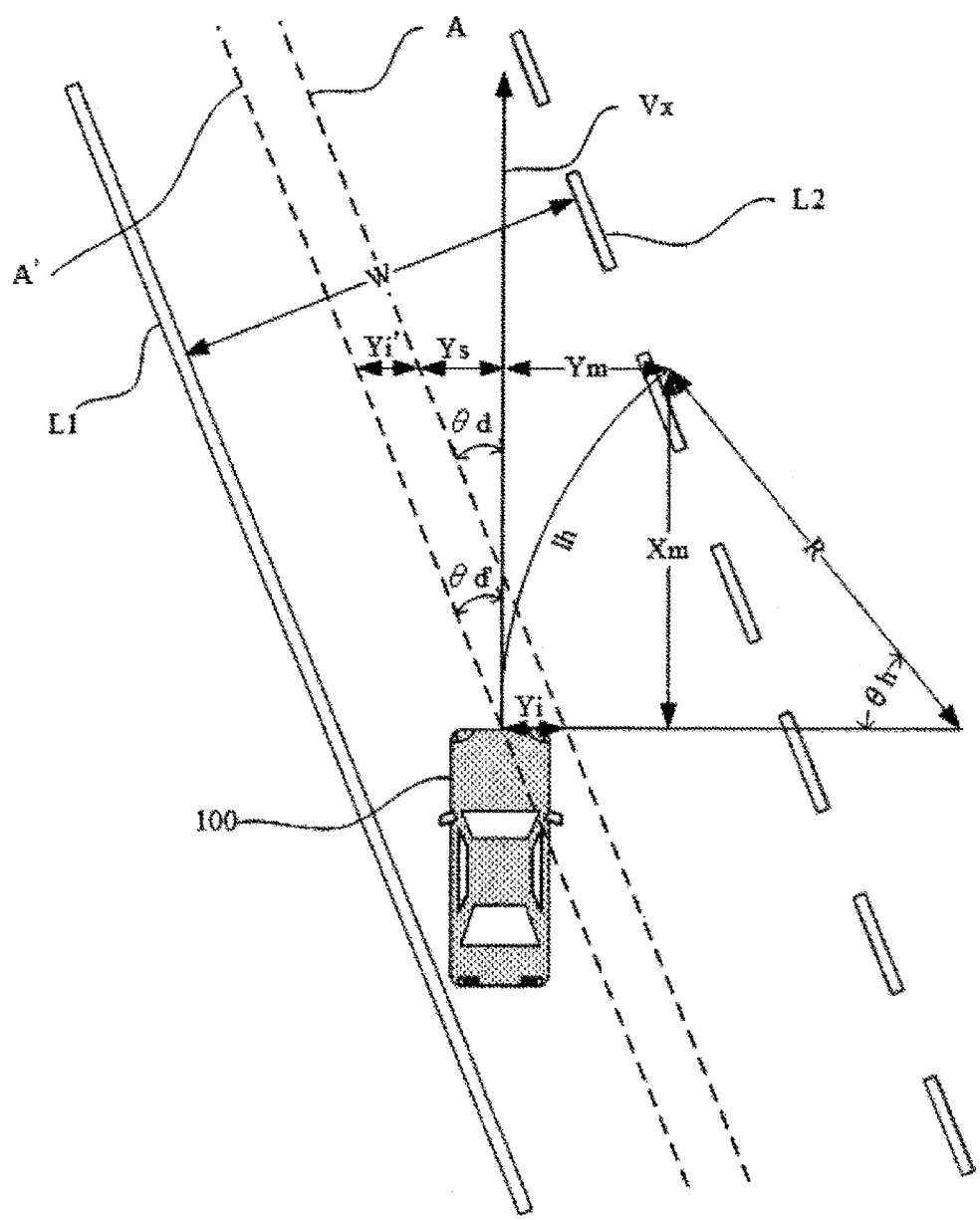
FIG. 5 is a diagram illustrating each symbol for describing the present embodiment.

Symbols indicating the relationship between the host vehicle 100 and the traffic lane, will be described with FIG. 5 in the description of the embodiment below. When the current velocity and yaw rate of the host vehicle 100 are defined as v [m/s] and ωh [rad/s], respectively, and the travel distance of the host vehicle with the velocity and a steering angle retained constant after t in time, is defined as lh in the figure, the following expression is satisfied:

$$v = lh \Delta t \quad \text{[Mathematical Formula 1]}$$

When the yaw angle variation of the host vehicle after the t in time is defined as θh in the figure, the following expression is satisfied:

$$\omega h = \theta h \Delta t \quad \text{[Mathematical Formula 1]}$$

The turning radius of the host vehicle 100 in this case defined as R in the figure, is calculated by the following formula:

$$R = lh \div \theta h$$

The travel distance in the lateral direction and the travel distance in the front and back direction of the host vehicle 100 in this case are defined as Ym and Xm, respectively.

A line indicating the middle position of the traffic lane, is indicated with A in the figure, the line extending in parallel to carriageway markings L1 and L2, and a line moved in parallel passing through the center of the host vehicle 100, is indicated with A' in the figure. The angle between the A in the figure and the orientation Vx of the host vehicle, is defined as θd, and the angle between the A' in the figure and the orientation Vx of the host vehicle, is defined as θd'. Since the A and the A' are parallel to each other, the θd and the θd' have the same value. The distance in the lateral direction from the line A indicating the middle position of the traffic lane to the center of the host vehicle, is defined as Yi in the FIG., and the value of Yi' moved in parallel is equal to that of the Yi.

In a case where the traveling has been performed for the t in time with the constant velocity and the constant steering angle retained with the current velocity and yaw rate of the host vehicle 100 defined as the v [m/s] and the ωh [rad/s], respectively, a move is made from the line A indicating the middle position of the traffic lane through a distance of the Ym+Ys in the lateral direction from the initial position and initial orientation of the host vehicle 100. In this case, the travel distance offset Ys in the lateral direction from the middle position, added to the travel distance Ym in the lateral direction of the host vehicle 100 from the line A indicating the middle position, is calculated by the following formula.

$$Ys = (R \sin \theta h) \times \tan \theta d - Yi \quad \text{[Mathematical Formula 4]}$$

The width of the traffic lane is indicated with W.

First Embodiment

The vehicular steering assistance control device being the one embodiment of the present invention, will be described below with reference to the drawings.

Figure 6:
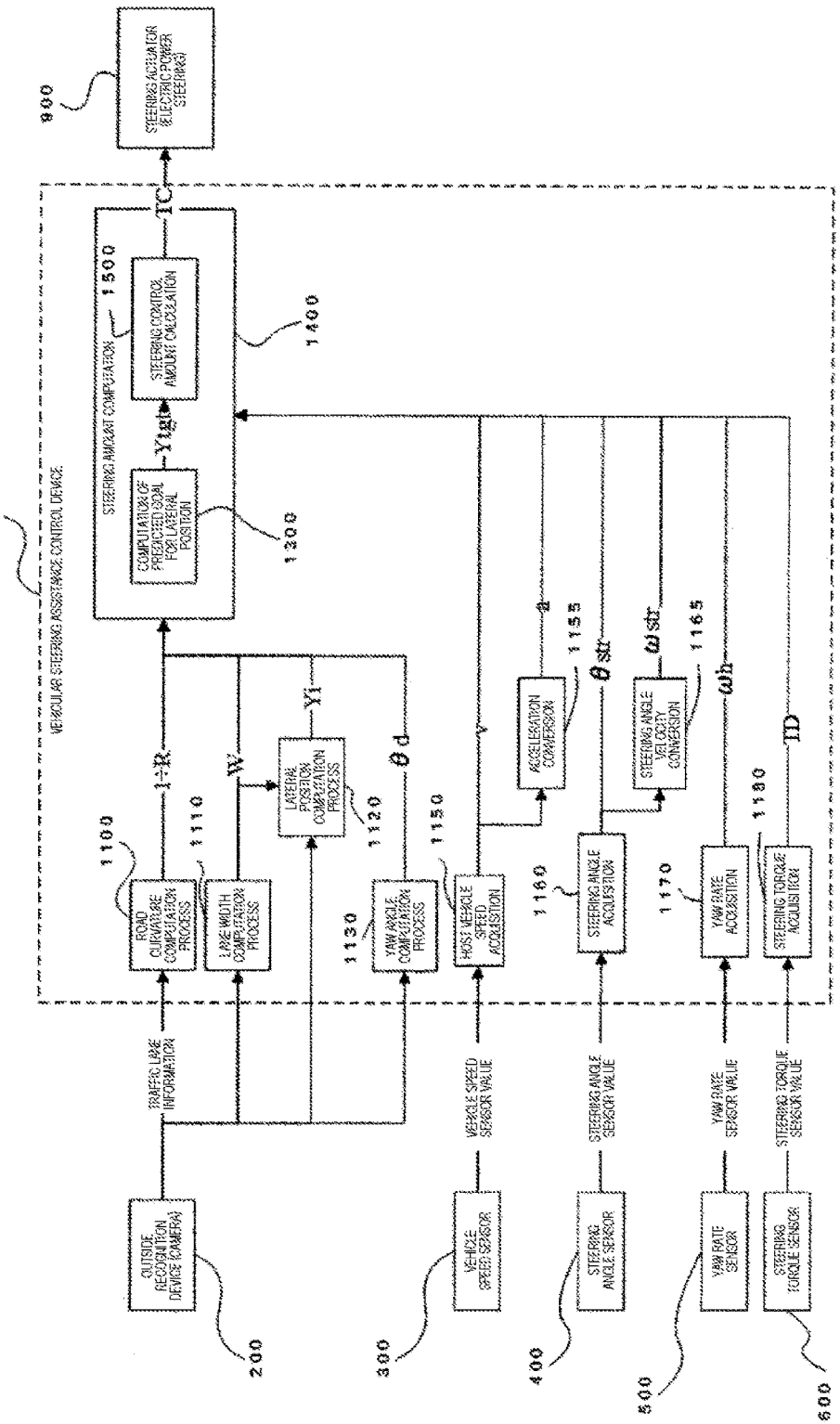
FIG. 6 is an exemplary control block diagram in a case where the present invention is applied.

FIG. 6 illustrates an exemplary control block diagram in a case where the present invention is applied.

The host vehicle 100 acquires, as traffic lane information, a road shape with a carriageway marking or a curb in the travel route of the host vehicle, from an outside recognition device 200, such as a camera, connected to the vehicular steering assistance control device 1000, and then acquires, from the information, the curvature of the road 1÷R with a road curvature computation process 1100. Similarly, the traffic lane width W of the roadway is acquired from the traffic lane information with a lane width computation process 1110. The lateral position Yi from the middle of the traffic lane from the traffic lane information and the traffic lane width W, with a lateral position computation process 1120. The yaw angle θd of the host vehicle to the traffic lane, is acquired from the traffic information with a yaw angle computation process 1130.

On the basis of a vehicle speed sensor value acquired from a vehicle speed sensor 300 connected to the vehicular steering assistance control device 1000, the velocity v of the host vehicle is acquired with host vehicle speed acquisition 1150. Furthermore, a variation in time is calculated to the velocity v that has been acquired, with an acceleration conversion process 1155 so that the acceleration a of the host vehicle is calculated.

On the basis of a steering angle sensor value acquired from a steering angle sensor 400 connected to the vehicular steering assistance control device 1000, the steering angle θstr of the host vehicle is acquired with steering angle acquisition 1160. Furthermore, a variation in time is calculated to the steering angle θstr that has been acquired, with steering angle velocity conversion 1165 so that a steering angle velocity ωstr is calculated. On the basis of a yaw rate sensor value acquired from a yaw rate sensor 500 connected to the vehicular steering assistance control device 1000, the yaw rate ωh of the host vehicle is acquired with yaw rate acquisition 1170.

On the basis of a steering torque sensor value acquired from a steering torque sensor 600 connected to the vehicular steering assistance control device 1000, driver steering torque TD is acquired with steering torque acquisition 1180. Steering amount computation 1400 is processed on the basis of the information that has been acquired above. The steering amount computation 1400 includes computation of a predicted goal for lateral position 1300 and steering control amount calculation 1500. A predicted goal lateral position Ytgt is first calculated with the computation of the predicted goal for lateral position 1300.

Furthermore, a steering torque control amount TC is calculated with the steering control amount calculation 1500 on the basis of the predicted goal lateral position Ytgt, the host vehicle lateral position Yi, the yaw rate ωh, the velocity of the host vehicle v, the yaw angle θd to the traffic lane, the yaw angle variation θh of the host vehicle, and the turning radius R.

The vehicular steering assistance control device 1000 gives, as a command value, the steering torque control amount TC calculated with the steering amount computation 1400, to a steering actuator 900, such as electric power steering, so as to perform steering control of the host vehicle.

Figure 7:
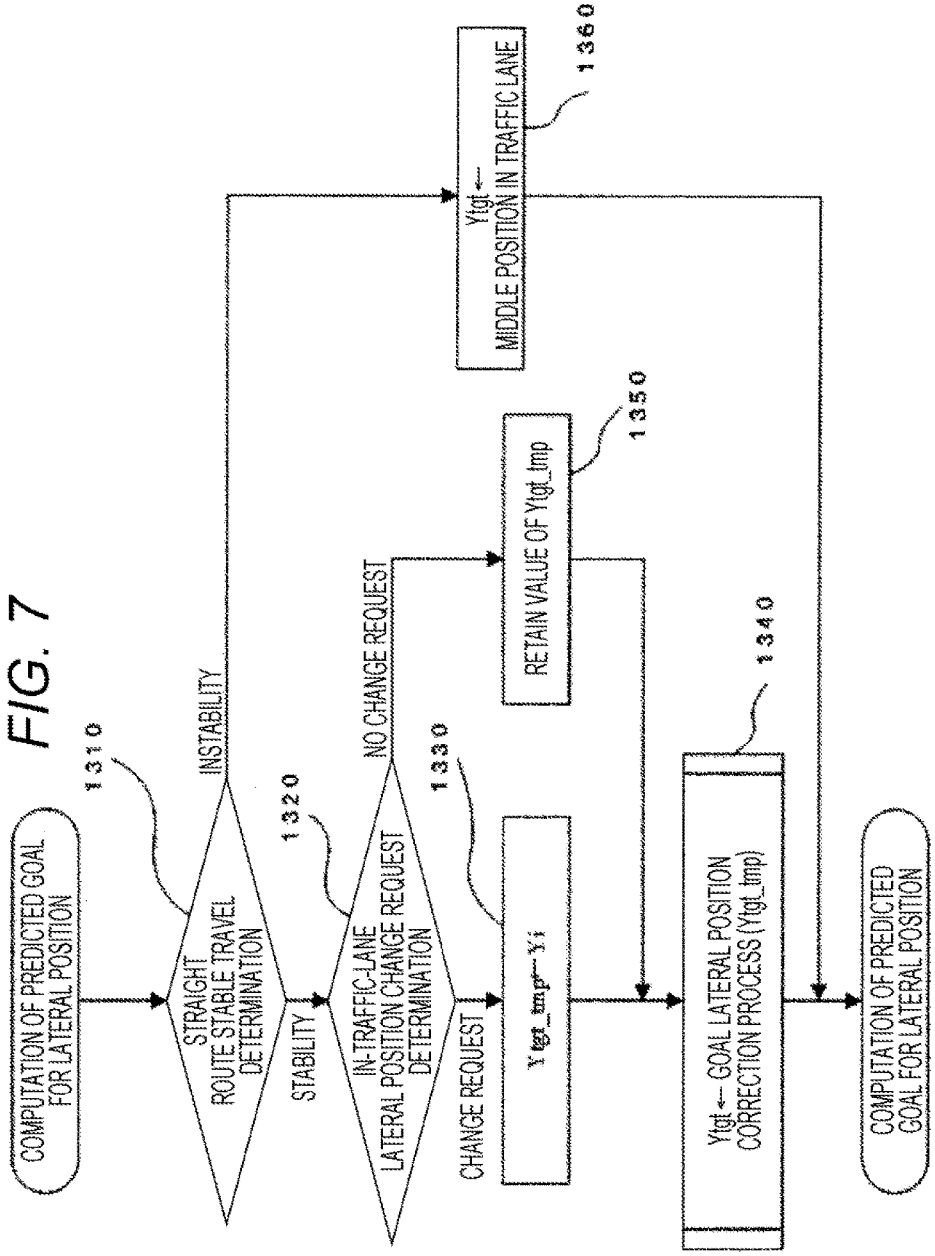
FIG. 7 is a flowchart of a computation process of a predicted goal for lateral position.

FIG. 7 illustrates a flowchart indicating the details of the computation of the predicted goal for lateral position 1300. While the vehicle is traveling, the computation of the predicted goal for lateral position 1300 is repeatedly performed so that the steering control of the vehicle is performed. The computation of the predicted goal for lateral position 1300, first checks, as a premise, whether all the following conditions have been satisfied, with straight route stable travel determination 1310.

The absolute value of the (1÷R) is less than a straight route stable travel threshold value.

The absolute value of the θstr is less than a straight route stable travel threshold value.

The absolute value of the ωstr is less than a straight route stable travel threshold value.

The absolute value of the TD is less than a rapid steering determination threshold value.

The absolute value of the θd is less than a stable travel threshold value.

The absolute value of the Yi is a stable travel threshold value or more.

The v is a control threshold value or more.

The v is less than a control upper limit threshold value.

No failure in a related device is detected.

In a case where instability is determined as a result of the straight stable travel determination 1310, the middle position (a zero value) in the traffic lane is set to the Ytgt. With this arrangement, the lateral position being a goal is set to the middle in the traffic lane in a case where the unstable traveling is being performed. Thus, stability is ensured to prevent deviation from the traffic lane by disturbance due to, for example, a step on the road in traveling in a position close to either the left or the right in the traffic lane in a case where the traveling is being performed without the stability ensured.

In a case where stability is determined with the straight route stable travel determination 1310, if a certain period of time has passed with all the following conditions satisfied, in-traffic-lane lateral position change request determination 1320 determines that a change request has been made, and if not, the in-traffic-lane lateral position change request determination 1320 determines that no change request has been made.

The absolute value of (the TD–the TC)<a driver torque comparable threshold value.

The absolute value of the θd is less than a straight travel threshold value.

In a case where the in-traffic-lane lateral position change request determination 1320 determines that a lateral position change request has been made, the host vehicle lateral position Yi is set to a predicted goal lateral position temporary value Ytgt_tmp with process 1330. In a case where the in-traffic-lane lateral position change request determination 1320 determines that no lateral position change request has been made, the processing proceeds to a process 1350 so that the value of the Ytgt_tmp is retained, the value being the last value. After that, a goal lateral position correction process 1340 is performed to the Ytgt_tmp so that the Ytgt_tmp is set to the predicted goal lateral position.

The in-traffic-lane lateral position change request determination 1320 switches the processing to detect a case where the driver steering torque is being generated to balance with the control steering torque after the point Y illustrated in FIG. 4, namely, whether the driver intentionally attempts to travel in a position close to either the left or the right from the middle of the traffic lane. In a case where deviation has been temporarily made from the middle of the traffic lane, the goal position is not changed so that the goal lateral position can be naturally switched.

Figure 8:
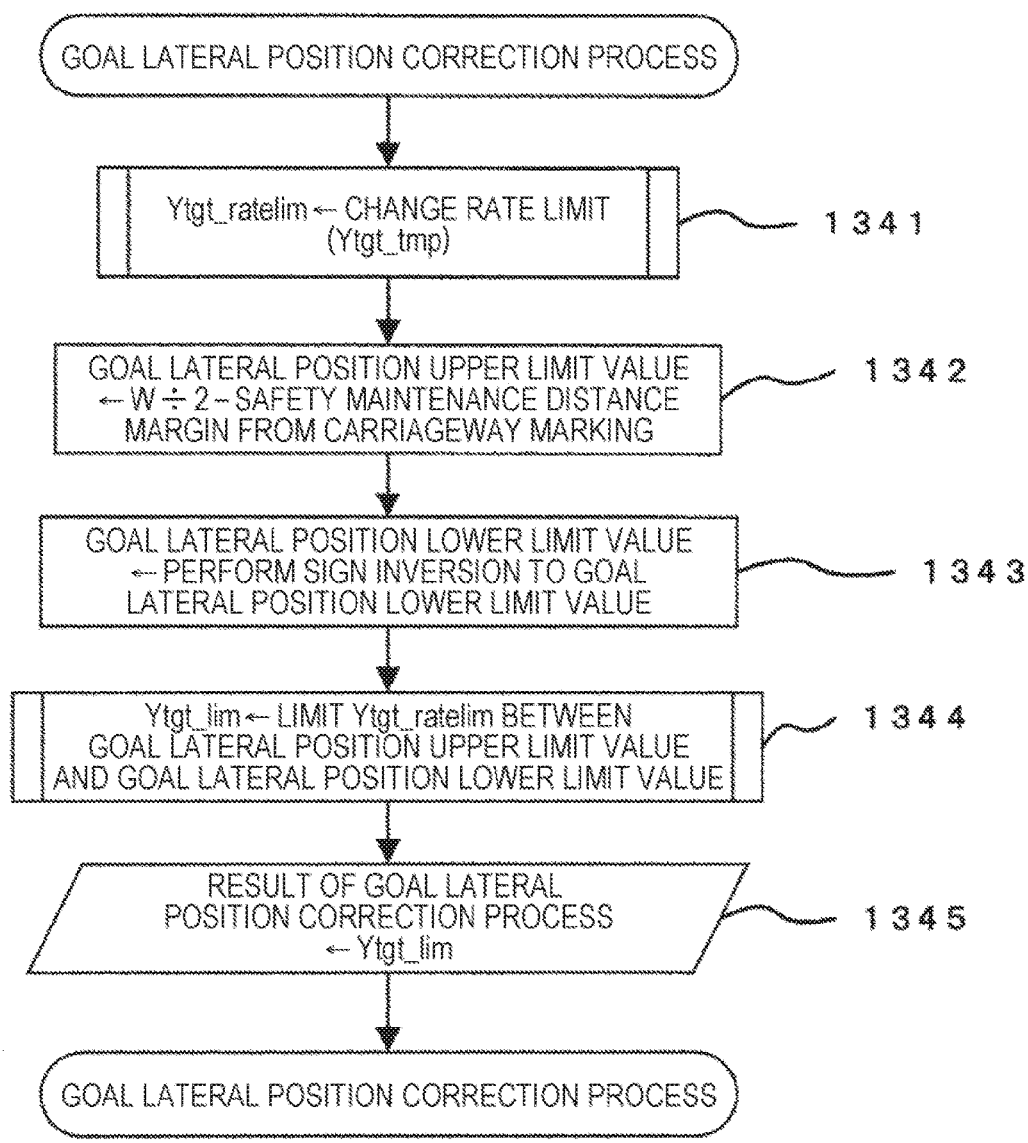
FIG. 8 is a flowchart of a goal lateral position correction process.

FIG. 8 illustrates a flowchart expressing the details of the goal lateral position correction process 1340. In the goal lateral position correction process 1340, a change rate limit process is performed to the Ytgt_tmp with a change rate limit process 1341 so that Ytgt_ratelim is calculated. The change rate limit value in this case, is set to a large value so that the driver is prevented from being given a sense of discomfort due to a rapid change of the TC based on a rapid change of the Ytgt and the fatigue of the driver can be reduced as much as possible. The value is tuned in accordance with the vehicle and the characteristics of the electric power steering. Desirably, the value is dynamically switchable to be small when the velocity is high and to be large when the velocity is low, in accordance with the current velocity of the host vehicle. Next, a goal lateral position upper limit value is calculated with a process 1342. The goal lateral position upper limit value is set to a value in which a safety maintenance distance margin from the carriageway marking, is subtracted from the value of the traffic lane width divided by two. The safety maintenance distance margin from the carriageway marking, is calculated in inverse proportion to the velocity v of the host vehicle. In a process 1343, sign inversion is performed to the goal lateral position upper limit value calculated with the process 1342 so that the goal lateral position upper limit value is set to a goal lateral position lower limit value. After that, in a process 1344, a limit process is performed to the Ytgt_ratelim calculated with the process 1341, with the goal lateral position upper limit value and the goal lateral position lower limit value acquired with the process 1342 and the process 1343, respectively, so that Ytgt_lim is acquired. Finally, the Ytgt_lim is set as a result of the goal lateral position correction process 1340, with a process 1345. With this arrangement, even when unexpected steering occurs, an extension can be given to the control until the deviation from the traffic lane or the time in which the driver can intervene, and thus safety improves.

Figure 9:
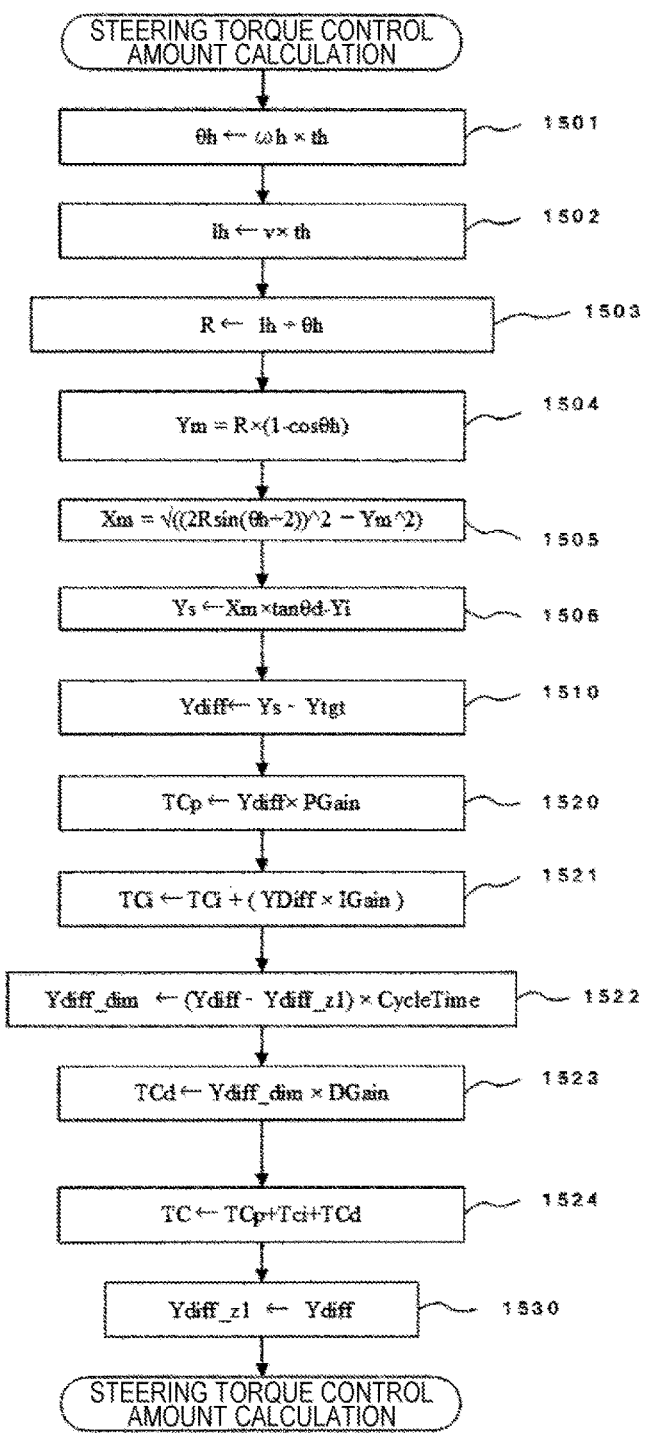
FIG. 9 is a flowchart of steering torque control amount calculation.

FIG. 9 illustrates a flowchart expressing the details of the steering torque control amount calculation 1500. The steering torque control amount calculation 1500 estimates in which position the host vehicle 100 is traveling when control target time th [s] has passed. Therefore, the <ah is multiplied by the th with a process 1501 so that the relative yaw angle θh of the host vehicle after the control target time to the current host vehicle, is calculated. Next, the v is multiplied by the th with a process 1502 so that the travel distance lh is acquired at the control target time. With descriptions omitted in the flowchart, providing a correction value on the basis of the value of the current acceleration a in each of the process 1501 and the process 1502, improves the control performance further, and thus the correction value is desirably taken into consideration. Next, the lh calculated with the process 1501 is divided by the θh calculated with the process 1502 in a process 1503 so that the turning radius R of the host vehicle is acquired. Furthermore, in a process 1504, the lateral direction travel distance Ym after the control target time is calculated by the following formula:

$$Ym = R \times (1 - \cos\theta h) \qquad \text{[Mathematical Formula 5]}$$

Furthermore, in a process 1505, the longitudinal direction travel distance Xm after the control target time is calculated by the following formula:

$$Xm = \sqrt{\left(2R \cdot \sin\frac{\theta h}{2}\right)^2 - Ym^2} \qquad \text{[Mathematical Formula 6]}$$

Furthermore, in a process 1506, the lateral position Ys after the control target time is calculated by the following formula:

$$Ys = Xm \times \tan\theta d - Yi$$

Next, in a process 1510, a lateral position deviation Ydiff used to calculate a control value, is calculated by the following formula:

$$Ydiff = Ys - Ytgt$$

Next, with the processes 1520 to 1523, gain control is performed to a proportional term TCp, an integral term TCi, and a differential term TCd in PID control to make the respective calculations thereof. Then, the sum total is calculated with a process 1524 so that the control steering torque TC is calculated.

Figure 10:
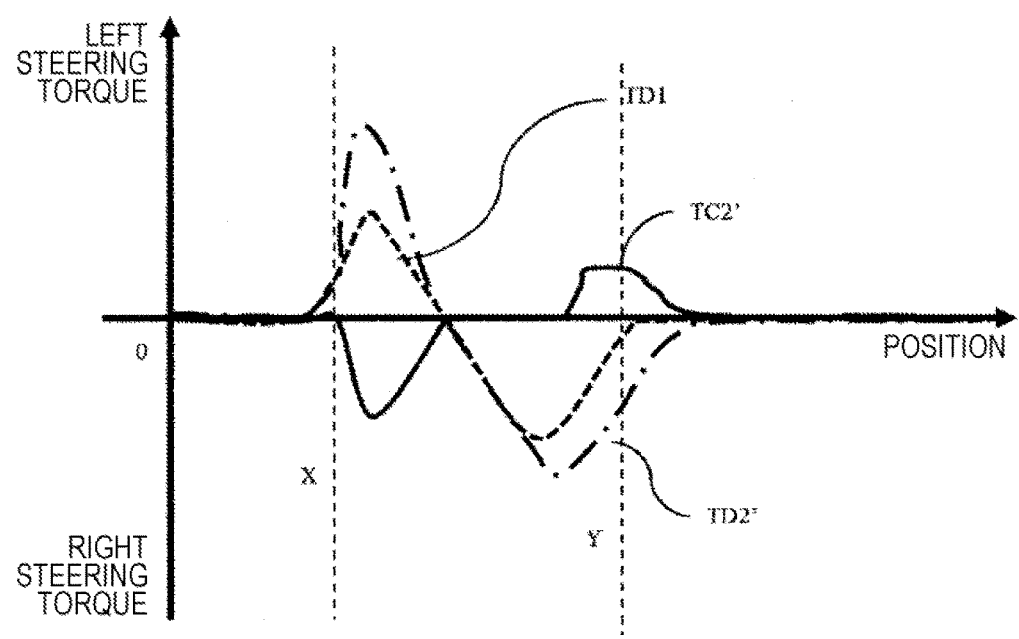
FIG. 10 illustrates a waveform in the steering torque performed by the driver and a waveform in the steering torque performed by the control in the application of the present invention.

FIG. 10 illustrates a waveform in the steering torque by the driver and a waveform in the steering torque by the steering assistance control when the present invention has been applied in the first embodiment. In FIG. 10, a waveform TD1 represents the driver steering torque in the steering assistance non-control, a waveform TD2 represents the driver steering torque in the steering assistance control, and a waveform TC2' represents the control steering torque in the steering assistance control. For the steering assistance torque TC2' in the application of the present invention, the steering assistance torque gradually returns to zero in a case where the traveling starts in parallel to the carriageway marking after the pass of the point Y, in comparison to the control steering torque TC2 before the application of the present invention, illustrated in FIG. 4. Therefore, the driver steering torque also becomes zero. Thus, there is no need to output the driver steering torque for performing straight traveling in the position deviating from the middle of the traffic lane after the pass of the point Y so that the burden of the driver can be reduced.

Second Embodiment

Figure 11:
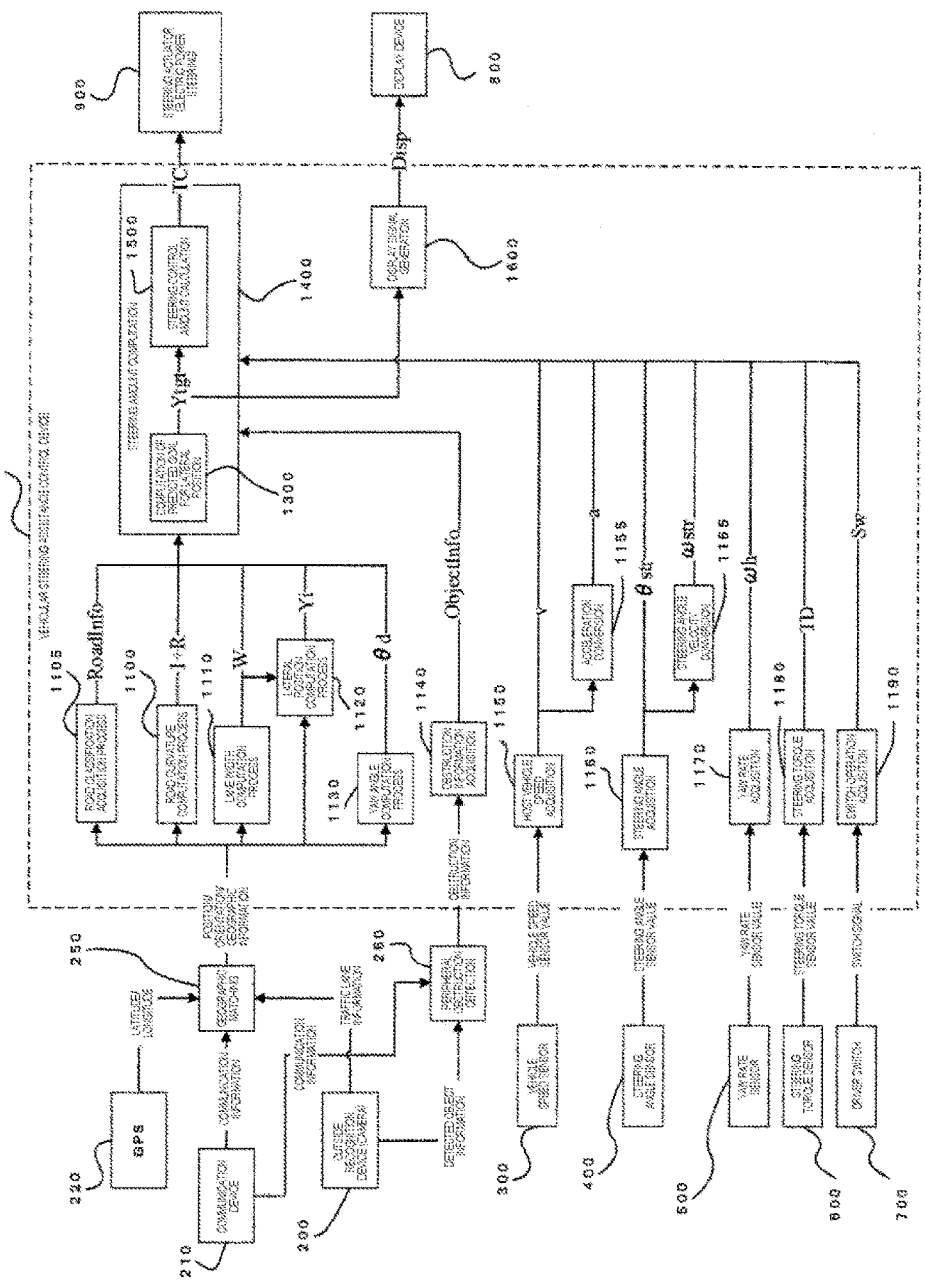
FIG. 11 is a second exemplary control block diagram in a case where the present invention is applied.

Next, a modification of a vehicular danger notification control device according to a different embodiment of the present invention, will be described. FIG. 11 illustrates a modification of the control block diagram of FIG. 6 described in the first embodiment.

A host vehicle 100 includes a driver switch 700 for reflecting in which position a driver desirably travels in a roadway, provided together with, for example, steering and an indicator lever, to the configuration described in the first embodiment, so as to acquire switch information Sw from the driver with switch operation acquisition 1190. The Sw has five types of values including a current position, a right move, a left move, a middle move, and no operation, in accordance with a switch operation of the driver. The Sw that has been acquired, is used for computation, of a predicted goal for lateral position, and the flowchart illustrated in FIG. 7 is modified to a flowchart of the computation of the predicted goal for lateral position, with the switch operation, illustrated in FIG. 12.

In the computation of the predicted goal for lateral position with the switch operation, the conditions of the in-traffic-lane lateral position change request determination 1320, are replaced with driver switch determination 1321 in order to make a switch between processes performed with the values of the Sw. In a case where a determined result of the driver switch determination 1321 indicates the current position, with a process 1330, a host vehicle lateral position Yi is set to a predicted goal lateral position temporary value Ytgt_tmp so that traveling is performed remaining in the current position. In case where the determined result indicates the right move, with a process 1331, a lateral travel amount offset YOffset is subtracted from the last goal lateral position to acquire the predicted goal lateral position temporary value Ytgt_tmp so that the position being the goal is changed in the right direction. Conversely, in a case where the determined result indicates the left move, with a process 1332, the lateral travel amount offset YOffset is added to the last goal lateral position to acquire the predicted goal lateral position temporary value Ytgt_tmp so that the position being the goal is changed in the left direction.

In a case where the determined result indicates the middle move, with a process 1333, the middle position in the traffic lane is set to the predicted goal lateral position temporary value Ytgt_tmp so that the predicted goal lateral position moved in the right and the left with the switch operations of the right move and the left move, respectively, can be returned to the middle. In a case where the determined result indicates the no operation, with a process 1350, the value of the Ytgt_tmp is retained so as to be the value for the move to the right position if the last switch operation is the right move or the value for the move to the left position if the last switch operation is the left move. With this configuration, the travel position that the driver intends to take, can be directly reflected further so that understandability for the driver improves.

Figure 12:
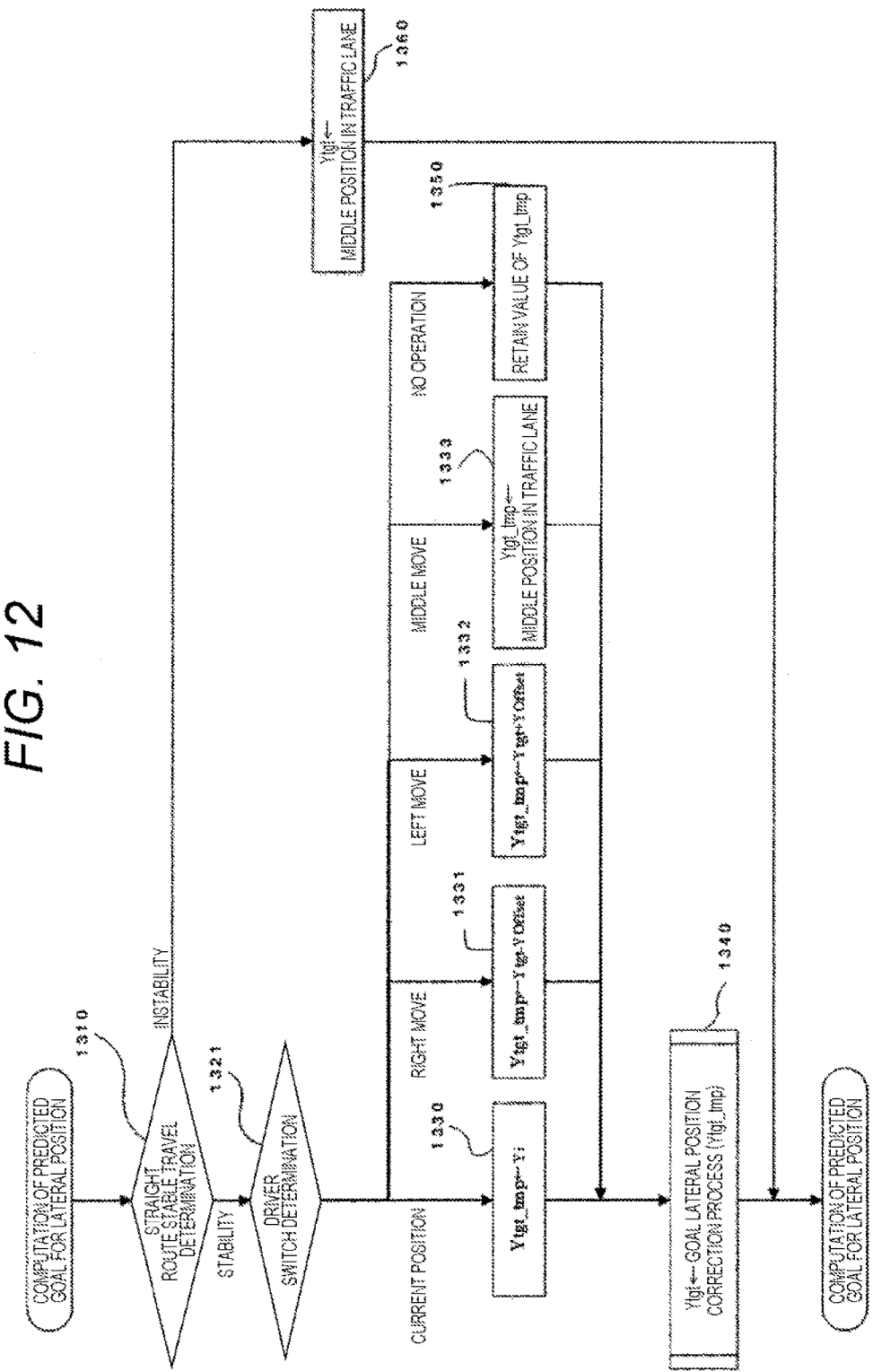
FIG. 12 is a flowchart of the computation process of the predicted goal for lateral position, modified with a driver switch.
Figure 13:
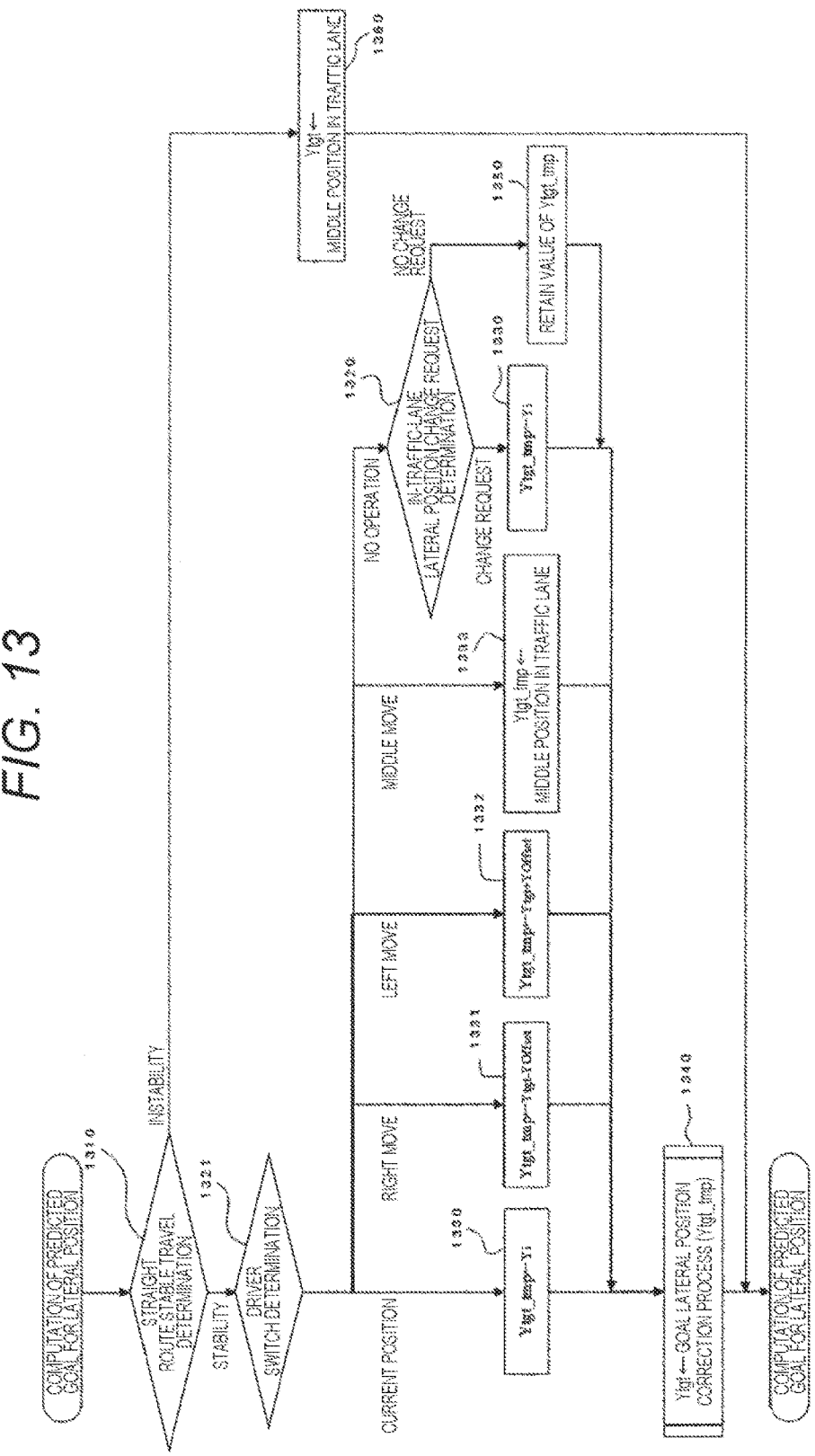
FIG. 13 is a flowchart of the computation process of the predicted goal for lateral position, including driver switch conditions combined.

The functions indicated with the flowchart of FIG. 7 and the flowchart of FIG. 12 are combined so that there is provided a modification of FIG. 13 in which the predicted goal lateral position is switched in consideration of the driver torque and the driver switch. For the switch of the predicted goal lateral position in consideration of the driver torque and the driver switch, in a case where the result of the determination 1321 illustrated in FIG. 12 indicates the no operation, the determination 1320 of FIG. 7 is performed so that the predicted goal lateral position is changed by the steering of the driver even when no switch operation is performed.

With this arrangement, the predicted goal lateral position can be changed even when no switch is operated. Thus, inconvenience in operating the switch, can be reduced and additionally an intention of directly switching the goal lateral position desirably, can be given. The determination of the driver switch determination 1321 has priority over the determination 1320 so that the intention due to the switch operation having the intention of switching the goal lateral position, reflected more strongly from the prediction of the driver, can be reflected in the control.

Furthermore, a display device 800 is provided to the control block diagram of FIG. 6 described in the first embodiment, the display device 800 being given Disp generated and transmitted with display signal generation 1600 on the basis of the Ytgt generated by the computation process of the predicted goal for lateral position 1300, to issue an notification to the driver. Particularly in a case where the lateral position is switched with the driver switch, the display device is preferably provided in order for the driver to determine whether the control device has received the switch operation or has not received the switch operation due to the influence of disturbance that the driver does not intend.

The host vehicle 100 includes either a communication device 210 or GPS 220 or both thereof to the configuration described in the first embodiment, and is added with a mechanism capable of generating the position, orientation, and geographic information on the host vehicle from each piece of information with geographic information matching 250 together with information acquired from an outside recognition device 200. Generating the position, orientation, and geographic information on the host vehicle from a plurality of information sources, improves the precision of the information used for the control so that the control appropriate to a larger number of patterns can be performed.

For example, a curve, in a region being a blind spot of a camera or radar, that cannot be detected by the outside recognition device 200 independently, is detected early to make straight route stable travel determination 1310 early determine instability on the basis of the conditions. Then, the lateral position of the host vehicle in the traffic lane is adjusted to return to the middle of the traffic lane before an approach to the curve so that safety can improve. Even under a state where the camera cannot detect the carriageway marking due to a snow cover or aged degradation, the middle position of the traffic lane can be acquired from the geographic information so that the control can be performed.

With the geographic information matching 250, a road classification acquisition process 1105 is additionally provided so that road information RoadInfo is acquired, such as a distance to a right/left-turn route, a travel upper limit speed for the road, whether the road is an accident-prone point, a grade crossing, a no-passing road, a one-way route, or a superhighway. The RoadInfo that has been acquired, is used for the process 1342 in the goal lateral position correction process illustrated in FIG. 8, and either offset, addition or gain multiplication or both thereof appropriate to the value of the RoadInfo are performed in calculating the safety distance margin from the carriageway marking. With this arrangement, for example, if traveling is being performed on a superhighway, danger may be low even when the traveling is performed in a position close to the carriageway marking. Thus, the safety distance margin from the carriageway marking is set to a value approximate to zero so that the traveling can be performed in a more free position in the roadway. In contrast, if the traveling is being performed in a no-passing road on which an oncoming vehicle is present, the safety distance margin from the center line is increased to prevent; crossing of the center line from being performed wrongly. Thus, the distance from the center line to the host vehicle is increased to allow leeway so that safety can improve.

The host vehicle 100 acquires obstruction information with peripheral obstruction detection 260, with information acquired from the communication device 210 and detected object information from the outside recognition device 200, to the configuration described in the first embodiment. The obstruction information that has been acquired, is converted into ObjectInfo with obstruction information acquisition 1140. The ObjectInfo includes the type, travel direction, travel speed, and relative position of the obstruction to the host vehicle 100. Similarly to the RoadInfo, the ObjectInfo is used for the process 1342 in the goal lateral position correction process illustrated in FIG. 8, and either offset addition or gain multiplication or both thereof appropriate to the value of each piece of information in the ObjectInfo are performed in calculating the safety distance margin from the carriageway marking. With this arrangement, for example, in a case where a pedestrian is moving from the outside of the carriageway marking into the roadway ahead of the host vehicle, the safety distance margin from the carriageway marking is increased to improve safety. Similarly, in a case where it is detected that an overtaking vehicle is approaching, the safety distance margin from the carriageway marking is increased so that safety can improve.

A part of the mechanisms or the entirety is selected and mounted on the basis of the performance of each sensor, the design concept of the vehicle, and a cost conception stage so that functions appropriate to the preference of the driver, can be provided.

REFERENCE SIGNS LIST 1000 vehicular steering assistance control device
200 outside recognition device
300 vehicle speed sensor
400 steering angle sensor
500 yaw rate sensor
600 steering torque sensor
900 steering actuator
1300 computation of predicted goal for lateral position
1400 steering amount computation
1500 steering control amount calculation

The invention claimed is:

1. An apparatus comprising:
   a vehicular steering assistance control device that is configured to control a host vehicle to travel in a predetermined position in a traffic lane, wherein
   the vehicular steering assistance control device is configured to adjust a steering control amount in accordance with an intention of a driver, and
   the adjustment of the steering control amount in accordance with the intention of the driver, includes calculation of the predetermined position being a goal in the traffic lane, and calculation of the steering control amount for moving to the predetermined position being the goal in the traffic lane that has been calculated.

2. The apparatus according to claim 1, comprising:
   means for detecting in which position the host vehicle is present in the traffic lane;
   means for detecting which way the host vehicle is facing with respect to the traffic lane;
   means for detecting a velocity of the host vehicle;
   means for detecting a steering direction of the host vehicle;
   means for detecting a steering intention of the driver; and
   an actuator configured to automatically control steering of the host vehicle.

3. The apparatus according to claim 2, wherein
   the means for detecting which way the host vehicle is facing with respect to the traffic lane, includes: means for detecting a position in which the host vehicle is traveling from both ends of the traffic lane in which the host vehicle is traveling and an orientation of the host vehicle with respect to the traffic lane, from a center line, a carriageway marking, a curb, or a guardrail segmenting the traffic lane, with an outside recognition sensor including a camera or radar; or means for detecting the position in which the host vehicle is traveling and the orientation of the host vehicle with respect to the traffic lane with collation of GPS information and geographic information.

4. The apparatus according to claim 1, wherein
   the adjustment of the steering control amount in accordance with the intention of the driver, includes adjustment of the steering control amount with automatic control to avoid deviation from the traffic lane, without a steering intention of the driver for a traffic lane change, a right or left turn, or a collision avoidance action.

5. The apparatus according to claim 1, wherein
the adjustment of the steering control amount in accordance with the intention of the river, includes adjustment of the steering control amount in accordance with duration of a steering intention of the driver.

6. The apparatus according to claim 1, comprising:
a display device configured to notify the driver that the steering control amount has been adjusted in accordance with the intention of the driver.

7. The apparatus according to claim 1, wherein
the adjustment of the steering control amount in accordance with the intention of the river, includes detection of an obstruction on a periphery of the host vehicle with an outside recognition device including a camera or radar and a communication device, and adjustment of the steering control amount in accordance with a result of a position relationship between the obstruction and the host vehicle.

8. The apparatus according to claim 1, wherein
the adjustment of the steering control amount in accordance with the intention of the driver, includes disablement of the adjustment of the steering control amount in accordance with the intention of the driver, in a case where a system determines that traveling cannot be performed safely in a position close to either a left or a right in a roadway, in preference to the intention of the driver.

9. An apparatus comprising:
a vehicular steering assistance control device that is configured to control a host vehicle to travel in a predetermined position in a traffic lane, wherein
the vehicular steering assistance control device is configured to adjust a steering control amount in accordance with an intention of a driver, and
the adjustment of the steering control amount in accordance with the intention of the driver, includes disablement of the adjustment of the steering control amount in accordance with the intention of the driver, in a case where a system determines that traveling cannot be performed safely in a position close to either a left or a right in a roadway, in preference to the intention of the driver.

10. The apparatus according to claim 9, comprising:
means for detecting in which position the host vehicle is present in the traffic lane;
means for detecting which way the host vehicle is facing with respect to the traffic lane;
means for detecting a velocity of the host vehicle;
means for detecting a steering direction of the host vehicle;
means for detecting a steering intention of the driver; and
an actuator configured to automatically control steering of the host vehicle.

11. The apparatus according to claim 10, wherein
the means for detecting which way the host vehicle is facing with respect to the traffic lane, includes: means for detecting a position in which the host vehicle is traveling from both ends of the traffic lane in which the host vehicle is traveling and an orientation of the host vehicle with respect to the traffic lane, from a center line, a carriageway marking, a curb, or a guardrail segmenting the traffic lane, with an outside recognition sensor including a camera or radar; or means for detecting the position in which the host vehicle is traveling and the orientation of the host vehicle with respect to the traffic lane with collation of GPS information and geographic information.

12. The apparatus according to claim 9, wherein
the adjustment of the steering control amount in accordance with the intention of the driver, includes adjustment of the steering control amount with automatic control to avoid deviation from the traffic lane, without a steering intention of the driver for a traffic lane change, a right or left turn, or a collision avoidance action.

13. The apparatus according to claim 9, the adjustment of the steering control amount in accordance with the intention of the driver, includes calculation of the predetermined position being a goal in the traffic lane, and calculation of the steering control amount for moving to the predetermined position being the goal in the traffic lane that has been calculated.

14. The apparatus according to claim 9, wherein
the adjustment of the steering control amount in accordance with the intention of the driver, includes adjustment of the steering control amount in accordance with duration of a steering intention of the driver.

15. The apparatus according to claim 9, comprising:
a display device configured to notify the driver that the steering control amount has been adjusted in accordance with the intention of the driver.

16. The apparatus according to claim 9, wherein
the adjustment of the steering control amount in accordance with the intention of the driver, includes detection of an obstruction on a periphery of the host vehicle with an outside recognition device including a camera or radar and a communication device, and adjustment of the steering control amount in accordance with a result of a position relationship between the obstruction and the host vehicle.

* * * * *